(12) United States Patent
Kostanian et al.

(10) Patent No.: US 6,387,255 B1
(45) Date of Patent: May 14, 2002

(54) TRIPHASE EXTRACTION COLUMN

(75) Inventors: Artak Eranosovich Kostanian, Moskovskaj oblast (RU); Werner Bäcker, Wipperfürth (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/367,250

(22) PCT Filed: Feb. 9, 1998

(86) PCT No.: PCT/EP98/00693

§ 371 Date: Aug. 10, 1999

§ 102(e) Date: Aug. 10, 1999

(87) PCT Pub. No.: WO98/37939

PCT Pub. Date: Sep. 3, 1998

(30) Foreign Application Priority Data

Feb. 24, 1997 (DE) .......................................... 197 07 200

(51) Int. Cl.⁷ .............................................. B01D 11/04
(52) U.S. Cl. ..................... 210/197; 210/252; 210/511; 422/257
(58) Field of Search ................................. 210/634, 643, 210/197, 248, 252, 253, 255, 513, 519, 644, 511; 422/256, 257

(56) References Cited

U.S. PATENT DOCUMENTS

| | | | |
|---|---|---|---|
| 1,951,787 A | * | 3/1934 | Child et al. |
| 3,454,490 A | * | 7/1969 | Wallace |
| 3,666,405 A | * | 5/1972 | Winsel |
| 3,856,916 A | * | 12/1974 | Lefrancois et al. |
| 3,894,943 A | * | 7/1975 | Hartmann et al. |
| 4,251,668 A | | 2/1981 | Leaute |
| 4,290,882 A | * | 9/1981 | Dempsey et al. |
| 4,645,512 A | * | 2/1987 | Johns |
| 4,698,303 A | * | 10/1987 | Bailey et al. |
| 4,775,479 A | * | 10/1988 | Schugerl et al. |
| 5,330,756 A | | 7/1994 | Steuart et al. |
| 5,466,455 A | | 11/1995 | Huffstutler, Jr. et al. |
| 5,510,247 A | | 4/1996 | Komives et al. |
| 5,702,608 A | * | 12/1997 | Foos et al. |
| 6,090,352 A | * | 7/2000 | Kostanian |
| 6,129,842 A | * | 10/2000 | Kostanian |
| 6,143,178 A | * | 11/2000 | Kostanian |

FOREIGN PATENT DOCUMENTS

| | | |
|---|---|---|
| RU | 94-015776/26 | 4/1994 |
| WO | 9714486 A1 | 4/1997 |
| WO | 9714488 A1 | 4/1997 |

OTHER PUBLICATIONS

English–language abstract of SU 1629069 A, Ref. 91–316464/43, dated Jan. 30, 1989.
English–language abstract of SU 272947 A, Ref. 74–10775V/06, dated May 25, 1968.
Journal "Theoretische Grundlagen der chemischen Technologie", 1984, Part 18; No. 6, pp. 736–738.

\* cited by examiner

Primary Examiner—David A. Simmons
Assistant Examiner—Fred Prince
(74) Attorney, Agent, or Firm—Norris McLaughlin & Marcus

(57) ABSTRACT

Triphase extraction tower having two chambers connected at their top and bottom parts of overflows, and having ports for feeding and removing a first and second disperse phase.

5 Claims, 1 Drawing Sheet

TRIPHASE EXTRACTION COLUMN

Figure 1:
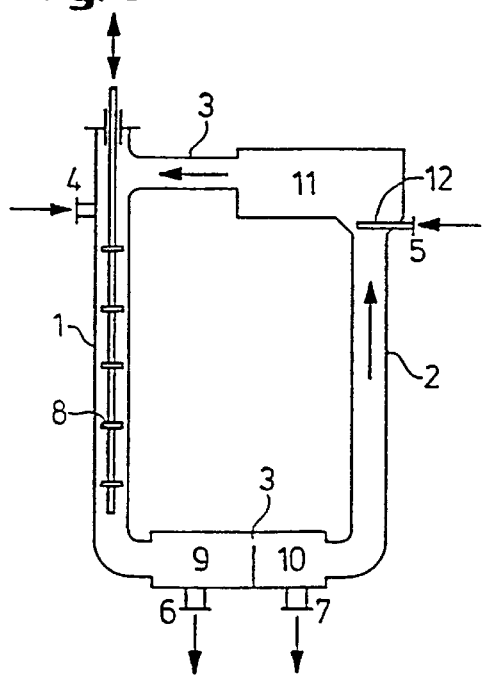

The invention starts from a three-phase extraction tower having two chambers which are connected in their top and bottom parts by connection channels and have ports for feeding and removing the first and second disperse phase.

A multiple phase extractor of this type can be used in chemical, hydrometallurgical, microbiological and other industrial branches for the separation, extraction, concentration and purification of substances.

Apparatuses for carrying out processes of the three-phase liquid extraction are known in the form of a two-chamber system, the two chambers being connected together in the upper part or having a porous dividing wall. The chambers are filled with a continuous phase through which two disperse phases, which are not soluble in the continuous phase, are passed in the form of droplets. In this case, substances are transferred from a disperse phase (raffinate phase) through the continuous phase (also termed liquid-membrane phase) into the other disperse phase (extract phase). (See, for example, Journal "Theoretische Grundlagen der chemischen Technologie" 1984, Part 18; No. 6, pp. 736–738)

These apparatuses require improvement with respect to their performance and extension to multistage processes.

From the technical standpoint and from the effect achievable, the three-phase extraction tower which consists of a first and second chamber filled with the continuous phase (liquid membrane) approximates most closely to the proposed apparatuses. The chambers have apparatuses for dispersing the respective phase and are connected to one another by overflows for circulating the continuous phase. The overflows are constructed in the form of tubes which connect the upper and bottom part of each of the chambers to one another. The extractor is equipped with ports for feeding and removing the first and second disperse phase. (Russian patent application no. 94-015776/26 (015406) of 27.04.94).

The phase to be dispersed, which is the starting solution (raffinate), and the solvent (extract phase) are each divided by a dispersion apparatus in the appropriate chamber into droplets which move as a droplet stream through the continuous phase. Because of the difference in density between the dispersions in the first and second chambers, the continuous phase circulates through the upper and lower overflows, so that the substances to be extracted transfer from one chamber into the other and from the first phase to be dispersed into the second.

The disadvantage of the known three-phase extraction tower is the high degree of axial mixing in the chambers, in particular in the chamber having countercurrent flow of the contacting phases, which, in the sense of countercurrent flow extraction, means a decrease in the efficiency.

The object of the invention is to increase the efficacy of the three-phase extraction tower.

This object is achieved according to the invention starting from the apparatus described at the outset by means of the fact that at least one chamber is equipped with internals.

According to a preferred embodiment, the internals are designed as packings.

Alternatively, the internals can also be designed as perforated plates.

Advantageously, the internals are constructed in the form of stirrer elements.

Preferably, the chambers have end separators which are connected by overflows.

A further development of the invention is characterized in that below a first stage having two chambers, further series-connected stages of the same construction are arranged.

Equipping the chambers with internals which are designed as packings (arranged or dumped) or perforated plates decreases the axial mixing of the circulating stream of the continuous phase, so that its flow behaviour is approximately comparable to plug-flow circulation. This considerably increases the efficicacy of all of the mass transport between the two chambers and between the first and second disperse phase. The installation of stirrer or mixing elements (conventional stirrers, reciprocating plates etc.) in one or both chambers also contributes to this. In this case, the exchange area is also increased and the axial mixing of the respective disperse phase is decreased.

Equipping the chambers with end separators which are connected by connection channels or overflows decreases the mixing of the two disperse phases.

The series connection of a plurality of stages in two-chamber towers can markedly improve the efficiency of the extraction process.

Figure 2:
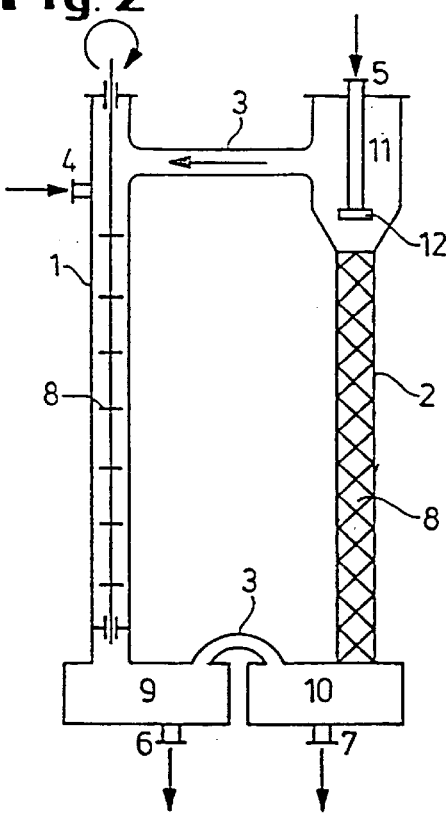
Figure 3:
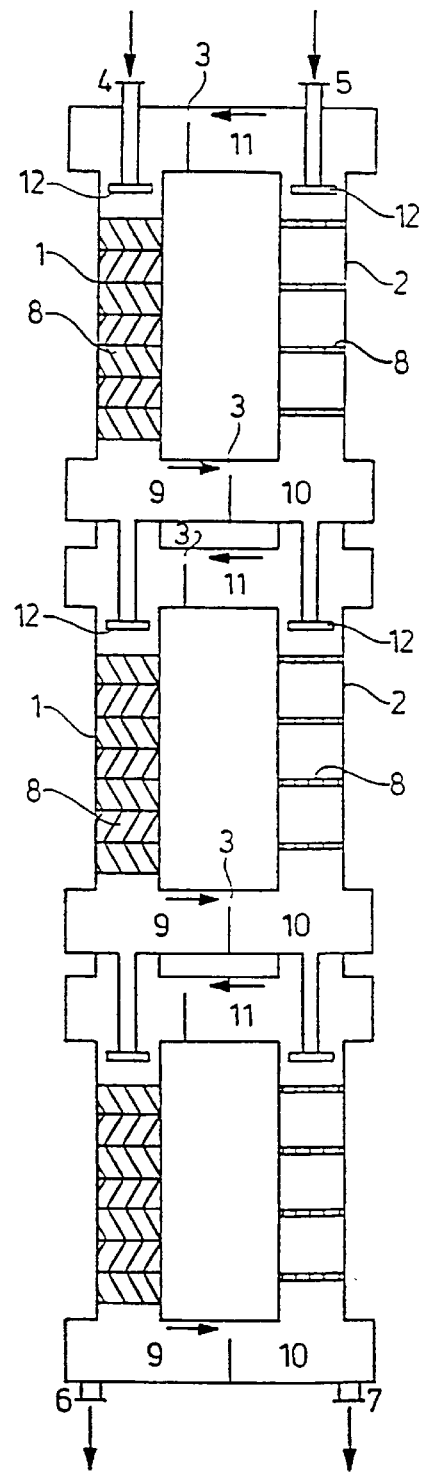

FIGS. 1–3 diagrammatically show three possible variants of the three-phase extraction tower according to the invention.

FIGS. 1–2 show single-stage extraction towers.

FIG. 3 displays a multistage tower.

In the three-phase extraction tower according to FIG. 1, exchange or mixing elements in the form of perforated reciprocating plates are installed in the first chamber 1. When static exchange elements are used, the dispersion can additionally be reinforced by pulsing the liquid. In the extraction tower according to FIG. 2, the internals in chamber 1 are constructed in the form of a rotating stirrers and in chamber 2 are constructed in the form of a dumped packing. In the extraction tower according to FIG. 3, the chambers 1 are equipped with an arranged packing and the chambers 2 with perforated plates.

The three-phase extraction tower in all of the designs fundamentally consists of the first (1) and the second chamber 2, which are connected in their top and bottom part by connection channels or overflows 2. The chambers 1 and 2 have ports 4 and 5 for feeding the first and second disperse phase and ports 6 and 7 for removing the first and second disperse phase. One or both chambers 1 and 2 are equipped with internals 8. The chambers 1 and 2 of the three-phase extraction tower have end separators 9 and 10 which are connected by connection channels or overflows 3. The chambers 1 (in which continuous and disperse phase are conducted in countercurrent) also has a separation zone 11 for separating off the droplets entrained by the continuous phase. The ports 4 and 5 for feeding the first and second phase to be dispersed can be provided with a distributor 12.

The three-phase extraction tower operates by the following principle:

The chambers 1 and 2 are filled with the continuous phase. The phases to be dispersed are fed to the chambers 1 and 2 through the ports 4 and 5 and if appropriate via the distributor 12. Depending on the densities of the liquids to be contacted, the droplets of the disperse phases move upwards or downwards in the chambers 1 and 2 and coalesce in the end separators 9 and 10. In the multistage apparatus, the dispersion and coalescence operations repeat in each stage. In this case, the dispersion of the phase to be dispersed is achieved by the distributors 12 and/or internals in the form of stirring elements, sieve plates or reciprocating plates (FIGS. 1 and 2). The two disperse phases are removed from the extraction tower by the ports 6 and 7.

In the motion of the droplet stream through the chambers 1 and 2, emulsions having different densities form. As a result, there occurs an ascending and, on the other side, a descending motion of the continuous phase. This results in a circulation of the continuous phase between the chambers 1 and 2 via the end separators 9 and 10, the separation zone 11 and the overflows 3.

When the circulating continuous phase flows through the chambers 1 and 2 having the internals 8, a flow state forms which approximates a piston flow. This advantage results owing to the decrease of hydraulic nonuniformities and of backmixing by the internals 8. As a result, the mixing of the first and second disperse phases is also reduced. The end separators 9 and 10 and the separation zone 11 also contribute to this.

The three-phase extraction tower can be used as an apparatus for separating substances by liquid membranes. The raffinate phase is then applied in the form of one of the disperse phases to one of the chambers 1 and 2. The substance to be extracted is extracted by the circulating continuous phase (which serves as liquid membrane) and is transferred to the other chamber, where reextraction by the second disperse phase takes place.

We claim:

1. Three-phase extraction tower having a first chamber and a second chamber, each of which has a top end and a bottom end, and which are connected to each other at their top and bottom parts by overflows for the passage of a continuous phase from one chamber into the other, said first chamber having an inlet for feeding a first disperse phase to said first chamber, a first end separator for the coalescence of said first disperse phase and separation of same from a continuous phase, before said continuous phase passes into said second chamber, and an outlet for withdrawing said first disperse phase from said first end separator, said second chamber having an inlet for feeding a second disperse phase to said second chamber, a second end separator for the coalescence of said second disperse phase and separation of same from a continuous phase, and an outlet for withdrawing said second disperse phase from said second end separator, wherein said first and second end separators are connected to each other and at least one of said chambers is equipped with internals.

2. Three-phase extraction tower according to claim 1, wherein the internals (8) are designed as packings.

3. Three-phase extraction tower according to claim 1, wherein the internals are designed as perforated plates.

4. Three-phase extraction tower according to claim 1, wherein the internals are constructed as stirring elements.

5. Three-phase extraction tower according to claim 1, comprising a first stage having two chambers, below which further series-connected stages having chambers are arranged.

* * * * *